United States Patent
Kamila et al.

(10) Patent No.: US 9,274,714 B2
(45) Date of Patent: Mar. 1, 2016

(54) METHOD AND SYSTEM FOR MANAGING STORAGE CAPACITY IN A STORAGE NETWORK

(75) Inventors: Shailaja Kamila, Sunnyvale, CA (US); James J. Voll, Sunnyvale, CA (US); Ameet Deulgaonkar, Sunnyvale, CA (US); Anurag Palsule, Sunnyvale, CA (US); Ramanathan S. Padinjarel, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 2149 days.

(21) Appl. No.: 12/259,145

(22) Filed: Oct. 27, 2008

(65) Prior Publication Data
US 2010/0106933 A1 Apr. 29, 2010

(51) Int. Cl.
*G06F 3/06* (2006.01)
*H04L 29/08* (2006.01)
*H04L 12/26* (2006.01)
*G06F 11/34* (2006.01)

(52) U.S. Cl.
CPC ............ *G06F 3/0629* (2013.01); *G06F 3/0605* (2013.01); *G06F 3/0689* (2013.01); *H04L 43/0817* (2013.01); *H04L 43/16* (2013.01); *H04L 67/1097* (2013.01); *G06F 11/3409* (2013.01); *G06F 11/3485* (2013.01); *G06F 2201/81* (2013.01)

(58) Field of Classification Search
None
See application file for complete search history.

(56) References Cited

U.S. PATENT DOCUMENTS

| | | | | |
|---|---|---|---|---|
| 5,784,702 | A * | 7/1998 | Greenstein et al. | 711/173 |
| 6,681,242 | B1 * | 1/2004 | Kumar et al. | 718/104 |
| 7,233,935 | B1 * | 6/2007 | Chandler | 706/47 |
| 2005/0138317 | A1 * | 6/2005 | Cannon et al. | 711/170 |
| 2005/0154576 | A1 * | 7/2005 | Tarui et al. | 703/22 |
| 2005/0283785 | A1 * | 12/2005 | D'Souza | 718/100 |
| 2006/0224852 | A1 * | 10/2006 | Kottomtharayil et al. | 711/170 |
| 2007/0043923 | A1 | 2/2007 | Shue | |
| 2007/0108707 | A1 | 5/2007 | Kobayashi | |
| 2007/0112870 | A1 | 5/2007 | Korupolu et al. | |
| 2008/0313109 | A1 * | 12/2008 | Machulsky et al. | 706/12 |

OTHER PUBLICATIONS

International Search Report PCT/US2009/062035 dated May 25, 2010, pp. 1-3.
Written Opinion PCT/US2009/062035 dated May 25, 2010, pp. 1-4.

* cited by examiner

*Primary Examiner* — Andrew Caldwell
*Assistant Examiner* — Michael Metzger
(74) *Attorney, Agent, or Firm* — Klein, O'Neill & Singh, LLP

(57) ABSTRACT

A system for managing configuration of a storage network having multiple storage resources is disclosed. The system uses a storage management policy to set parameters for detecting storage resource problems in the storage network. The system monitors the storage resources in the storage network based on the storage management policy. Based on the monitoring, the system detects limited storage resource conditions, and identifies one or more potential solutions to the condition. After identifying potential solutions, the system simulates effects on the storage resources of implementing individual solutions. Based on the simulations, the system then implements one or more selected solutions. These solutions may be selected automatically or by a user.

25 Claims, 9 Drawing Sheets

FIG. 5E

METHOD AND SYSTEM FOR MANAGING STORAGE CAPACITY IN A STORAGE NETWORK

BACKGROUND

In modern computer networks, a storage server can be used for many different purposes, such as to provide multiple users with access to shared data or to back up mission critical data. A file server is an example of a storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

One mode in which a file server can be used is a network attached storage (NAS) mode. In a NAS mode, a file server can be implemented in the form of an appliance, sometimes called a filer, that attaches to a network, such as a local area network (LAN) or a corporate intranet. An example of such an appliance is any of the Filer products made by NetApp®, Inc. in Sunnyvale, Calif. A storage server can also be employed in a storage area network (SAN), which is a highly efficient network of interconnected, shared storage devices. In a SAN, the storage server (which may be an appliance) provides a remote host with block-level access to stored data, whereas in a NAS configuration, the storage server provides clients with file-level access to stored data. In both NAS and SAN configurations, available storage is divided into various logical segments, such as volumes (for both NAS and SAN configurations) or qtrees (for a NAS configuration). A qtree is a special directory that has the properties of a logical sub-volume within the namespace of a physical volume. Individual qtrees may be assigned storage quotas and security properties.

The increasing size and complexity of modern storage networks has made storage capacity planning and storage administration difficult. Administrators can handle capacity issues using a number of corrective actions, but it can be very difficult for an administrator to identify the appropriate actions to take. In many instances, this difficulty forces administrators to migrate storage to new hardware rather than attempt to free space on existing hardware. Storage migration is expensive and disruptive. However, current tools provide insufficient assistance to administrators in solving storage problems.

BRIEF DESCRIPTION OF THE DRAWINGS

FIG. 5E is an example interface that can be used to delete backup snapshots.

DETAILED DESCRIPTION

A system for managing configuration of a storage network having multiple storage resources is disclosed (hereinafter referred to as the "storage management system" or "the system"). The storage management system uses a storage management policy to set parameters for detecting storage resource problems in the storage network. In some embodiments, the storage management policy defines storage thresholds for individual volumes such that a problem is detected when the available capacity falls below the threshold. The system monitors the storage resources (e.g. volumes, qtrees) in the storage network based on the storage management policy. Based on the monitoring, the system detects limited storage resource conditions, such as when the available capacity in a storage resource falls below the threshold set by the policy. When a limited storage resource condition is detected, the system identifies one or more potential solutions to the problem. Potential solutions may include, for example, increasing the size of the volume, decreasing the size of one or more volumes, deleting backup snapshots, and deleting unwanted data. After identifying potential solutions, the system simulates effects on the storage resources of implementing individual solutions. This may include, for example, determining an amount of storage space saved by deleting selected backup snapshots. Based on the simulations, the system then implements one or more selected solutions. These solutions may be selected automatically or by a user.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
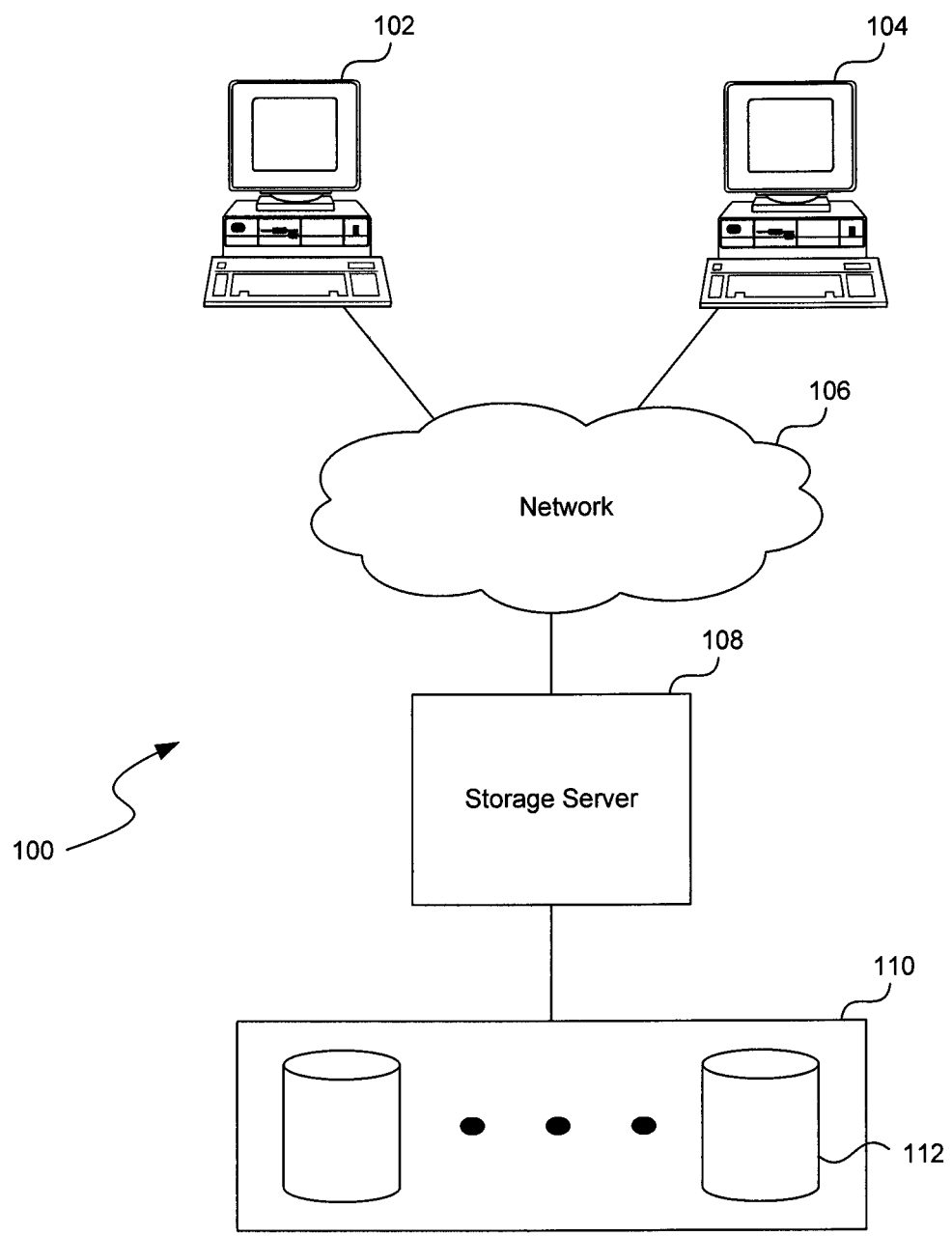
FIG. 1 is a network diagram of an environment in which a storage management system operates.

FIG. 1 is a network diagram of an environment 100 in which a storage management system operates. The various embodiments described herein are not limited to any particular environment, and may be implemented in various storage systems. In the present illustration, the environment 100 includes a storage server 108. The storage server 108 is coupled with a mass storage subsystem 110, which includes a set of mass storage devices 112, and to clients 102 through a network 106, such as a local area network (LAN) or other type of network. Each of the clients 102 may be, for example, a conventional personal computer (PC), workstation, or the like. The storage server 108 is also coupled to a management server 104, which includes management software configured to allow an administrator to manage the storage server 108 and the mass storage subsystem 110. The mass storage subsystem 110 is managed by the storage server 108. For example, the storage server 108 may receive and respond to various read and write requests from the clients 102, directed to data stored in or to be stored in the storage subsystem 110. The mass storage devices 112 in the mass storage subsystem 110 may be, for example, magnetic disks, optical disks such as compact disks-read only memory (CD-ROM) or digital versatile/video disks (DVD)-based storage, magneto-optical (MO) storage, tape-based storage, or any other type of nonvolatile storage devices suitable for storing large quantities of data.

The storage server 108 may have a distributed architecture; for example, it may include separate N-module (network module) and D-module (data module) components (not shown). In such an embodiment, the N-module is used to communicate with the clients 102, while the D-module includes the file system functionality and is used to communicate with the storage subsystem 110. In another embodiment, the storage server 108 may have an integrated architecture, where the network and data components are all contained in a single box or unit. The storage server 108 further may be coupled through a switching fabric to other similar storage systems (not shown) that have their own local storage subsystems. In this way, all of the storage subsystems can form a single storage pool, to which any client of any of the storage systems has access.

Figure 2:
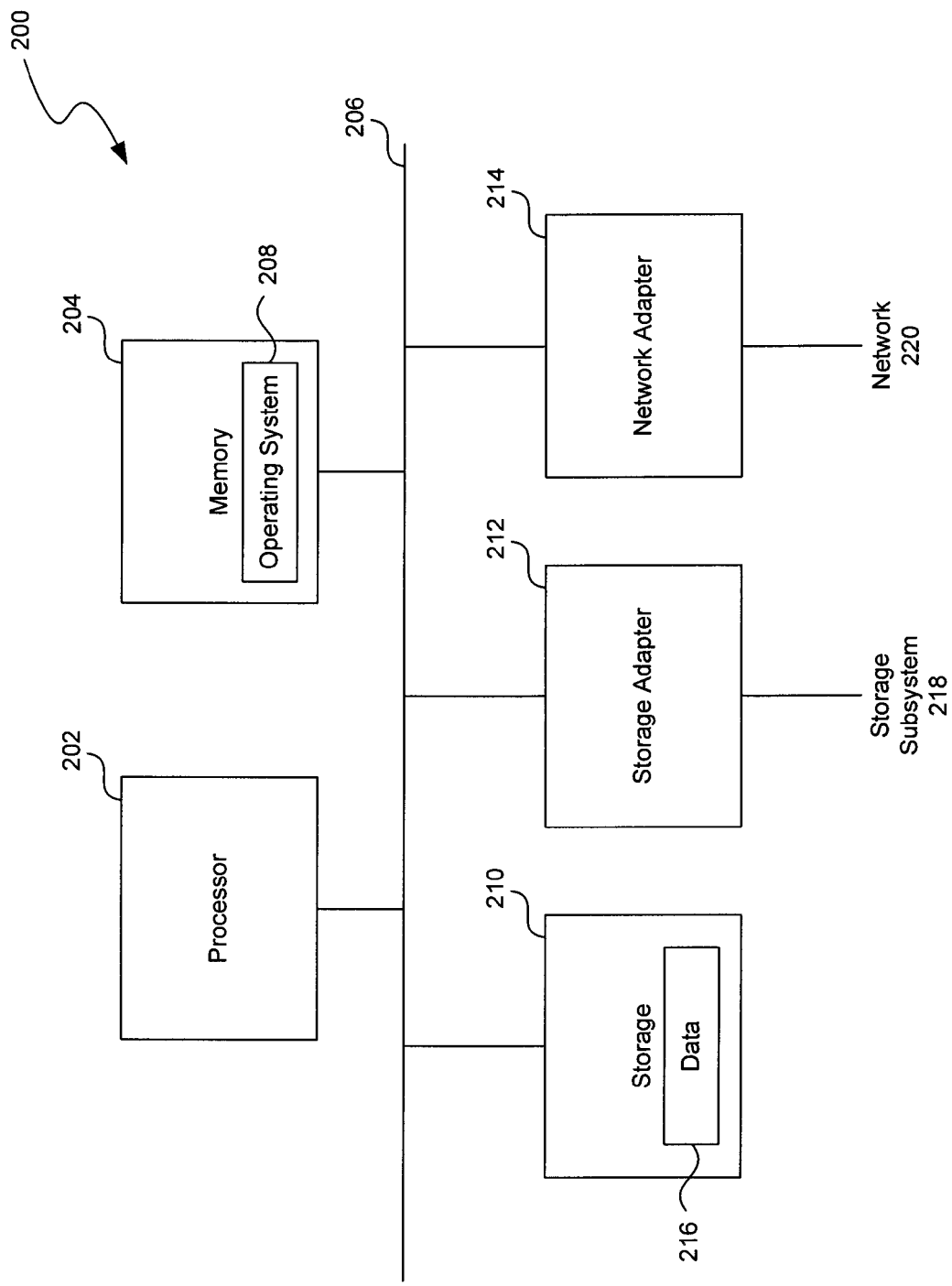
FIG. 2 is a high-level block diagram showing an example of the architecture of a storage server.

FIG. 2 is a high-level block diagram showing an example of the architecture of a storage server 200. The storage server 200 may represent the storage server 108 of FIG. 1.

The storage server 200 includes one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206, therefore, may include, for example, a system bus, a Peripheral Component Interconnect (PCI) family bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 202 may include central processing units (CPUs) of the storage server 200 and, thus, control the overall operation of the storage server 200. In certain embodiments, the processor(s) 202 accomplish this by executing software or firmware stored in memory 204. The processor(s) 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 204 is or includes the main memory of the storage server 200. The memory 204 represents any form of random access memory (RAM), read-only memory (ROM), flash memory, or the like, or a combination of such devices. In use, the memory 204 stores, among other things, the operating system 208 of the storage server 200.

A storage adapter 212 and a network adapter 214 are also connected to the processor(s) 202 through the interconnect 206. The storage adapter 212 allows the storage server 200 to access a storage subsystem 218 and may be, for example, a Fibre Channel adapter or a SCSI adapter. The network adapter 214 provides the storage server 200 with the ability to communicate with remote devices, such as clients, over a network 220 and may be, for example, an Ethernet adapter. The storage server 200 may further include local storage 210 coupled to the interconnect 206.

One skilled in the art will appreciate that the clients 102 and the management server 104 could be implemented using at least some of the same components. For example, a clients 102 or a management server 104 also includes a processor 202 and a memory 204 configured to store an operating system 208. The components are connected using an interconnect 206, such as a PCI bus or other system interconnection. The clients 102 or the management server 104 also includes a storage component 210, such as a hard drive or solid-state storage device, and a network adapter 214, as well as I/O devices (not shown).

Figure 3:
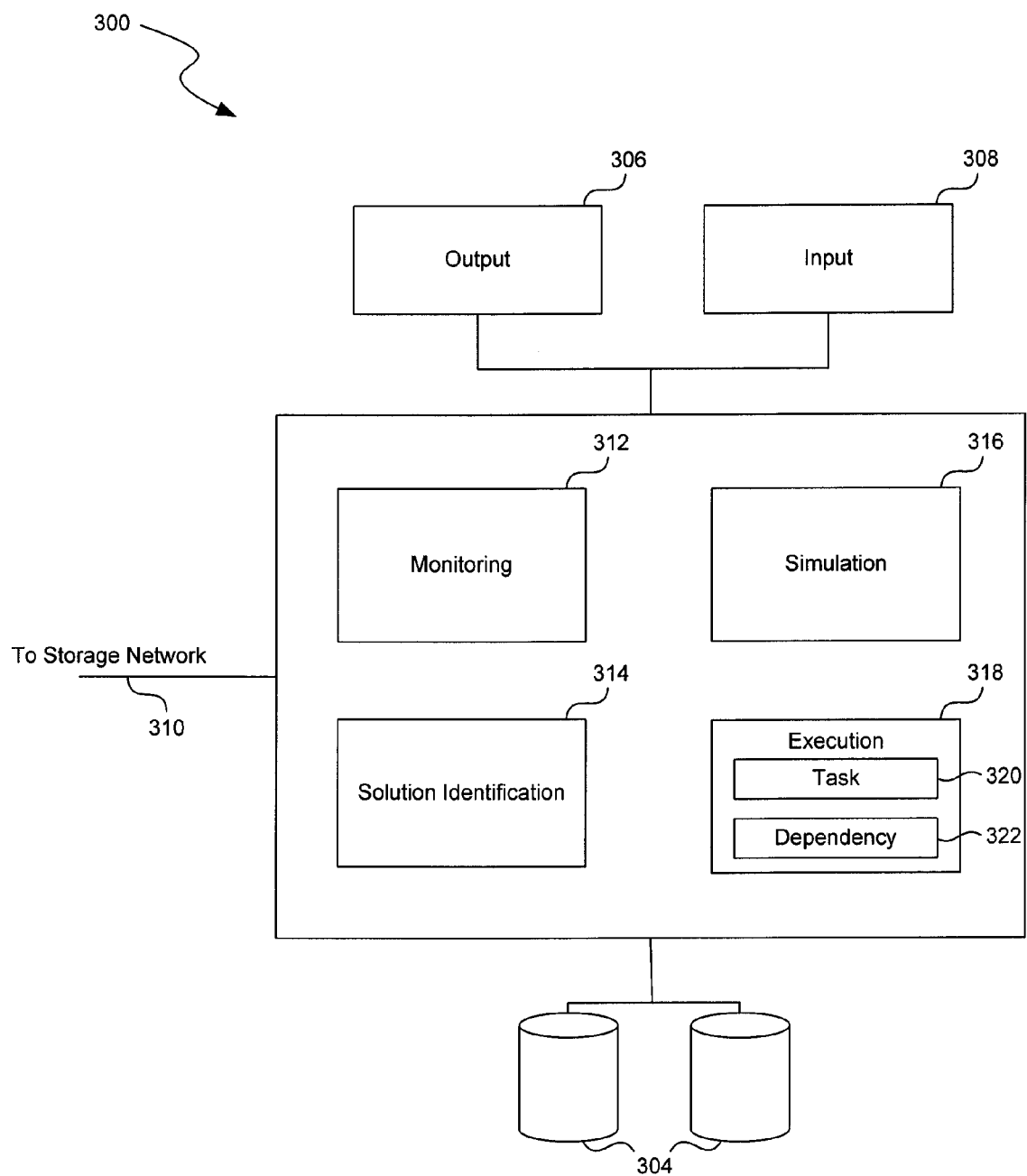
FIG. 3 is a block diagram of the storage management system.

FIG. 3 is a logical block diagram of the storage management system 300. The system 300 may be executed, for example, on the management server 104. Alternatively, the system 300 may be contained on a storage server 108 and accessed through a network connection. The system may also be contained on the clients 102. As will be described in additional detail herein, the system 300 includes a number of modules to facilitate the functions of the system. Although the various modules are depicted in a single server, the modules are not necessarily physically co-located. In some embodiments, the various modules could be distributed over multiple physical devices and the functionality implemented by the modules may be provided by calls to remote services. Similarly, the data storage area could be local storage or remote storage, and distributed in one or more physical devices. The code to support the functionality of this system may be stored on a computer-readable medium such as an optical drive, flash memory, or a hard drive. Aspects of the system 300 may be implemented as software, firmware, hardware, or as a combination of these.

The system 300 includes a processing component 302, which is configured to perform the monitoring, simulation, and execution steps carried out by the storage management system. The processing component 302 is connected to a storage component 304, which stores configuration and settings information used by the processing component 302. In particular, the storage component 304 stores the storage management policy. The processing component 302 is also connected to a output component 306 and an input component 308, which control input and output to the system 300. The output component 306 may be of any type generally used by a computer system to provide information to an end user. For example, the output component 306 could include a monitor, an audio speaker, or an alphanumeric display. Similarly, the input component 308 may be of any type that allows an end user to provide input into a computer system. For example, the input component 308 may be a keyboard, a mouse, or a speech recognition system. In some implementations, the system 300 is located on a device without input or display devices directly connected. In these implementations, the output component 306 and the input component 308 may be configured to provide input and output using the data connection 310.

The processing component 302 also has a data connection 310 to the storage network. The data connection 310 may be provided through any suitable hardware component. For example, the system 300 may use a network adapter 214 such as used in the computer system 200 shown in FIG. 2.

The processing component 302 includes a monitoring component 312, which is configured to monitor the storage space status of the storage server 108 and the mass storage subsystem 110. The processing of the monitoring component 312 is configured based on a storage management policy. The storage management policy defines storage conditions that are considered problems in the storage network and may be defined, for example, by a storage administrator. When the monitoring component 312 detects a problem, it generates an event indicating a limited storage resource condition. In one embodiment, the storage management policy defines various thresholds for storage usage. During the monitoring process, the monitoring component 312 monitors the space usage of the various storage resources within the storage network. It then compares space usage against the thresholds defined by the storage management policy. If the monitoring component 312 detects that one of the storage resources has exceeded the threshold defined in the policy, it generates an event indicating a limited storage resource condition.

The processing component 302 also includes a solution identification component 314, which is configured to respond to a limited storage resource condition detected by the monitoring component 312. After receiving the event notification from the monitoring component 312, the solution identification component 314 analyzes the current state of the storage resource in question and develops a set of potential solutions to the limited storage resource condition.

The processing component 302 includes a simulation component 316, which is configured to analyze and simulate the effects of implementing the solutions identified by the solution identification component 314. The simulation component 316 is used because the complexity of typical storage networks means that the results of implementing a particular solution are not easy to predict. For example, one potential solution is to delete one or more backup snapshots (i.e. backup data) of the volume. Because backup snapshots can be generated by storing the difference between current data in a volume and a previous snapshot, in such cases many snapshots will share multiple data blocks. When a snapshot is deleted, the system can only free data blocks if the data blocks are not used by other snapshots stored in the system or by the active file system. Thus, if the potential solution being evaluated is to delete one or more backup snapshots, the simulation component 316 evaluates the full set of snapshots stored in the system to determine which data blocks can be deleted when a snapshot or a set of snapshots is removed. The simulation process includes determining ownership of data blocks used for backup snapshot storage in order to determine the amount of space that could be gained by deleting selected snapshots. Similar processing is carried out to simulate other storage solutions, such as block deduplication and changing volume size. These solutions are discussed in greater detail below.

The processing component 302 also includes an execution component 318, which is configured to execute a solution selected from the set of solutions identified by the solution identification component 314. The selection of a solution may be specified by user input or it may be done automatically by the system. Automatically selecting a solution may include balancing performance costs of the solution against space saved, as determined by the simulations performed by the simulation component 316. The execution component 318 includes a task submodule 320, which develops a list of tasks that must be executed by the system in order to carry out the selected solution. Once these tasks are generated by the task submodule 320, the dependency submodule 322 generates a set of dependencies between these tasks. The set of dependencies is used, for example, to ensure that data is only deleted when no component in the system has any further need of it. After the list of tasks and the associated set of dependencies have been generated, the execution component 318 modifies the storage network in accordance with the selected solution. As an example, the selected solution may include re-allocating available storage space between two volumes if the space usage in the first volume is low over a considerable period of time. In this case, the tasks identified by the task submodule 320 could include (1) confirming available space in the first volume, (2) reducing the space allocated to the first volume, and (3) increasing the space allocated to the second volume by an equal amount. The dependency module 322 would then determine dependencies so that these tasks are executed in the proper order (i.e. 1, 2, 3).

Figure 4:
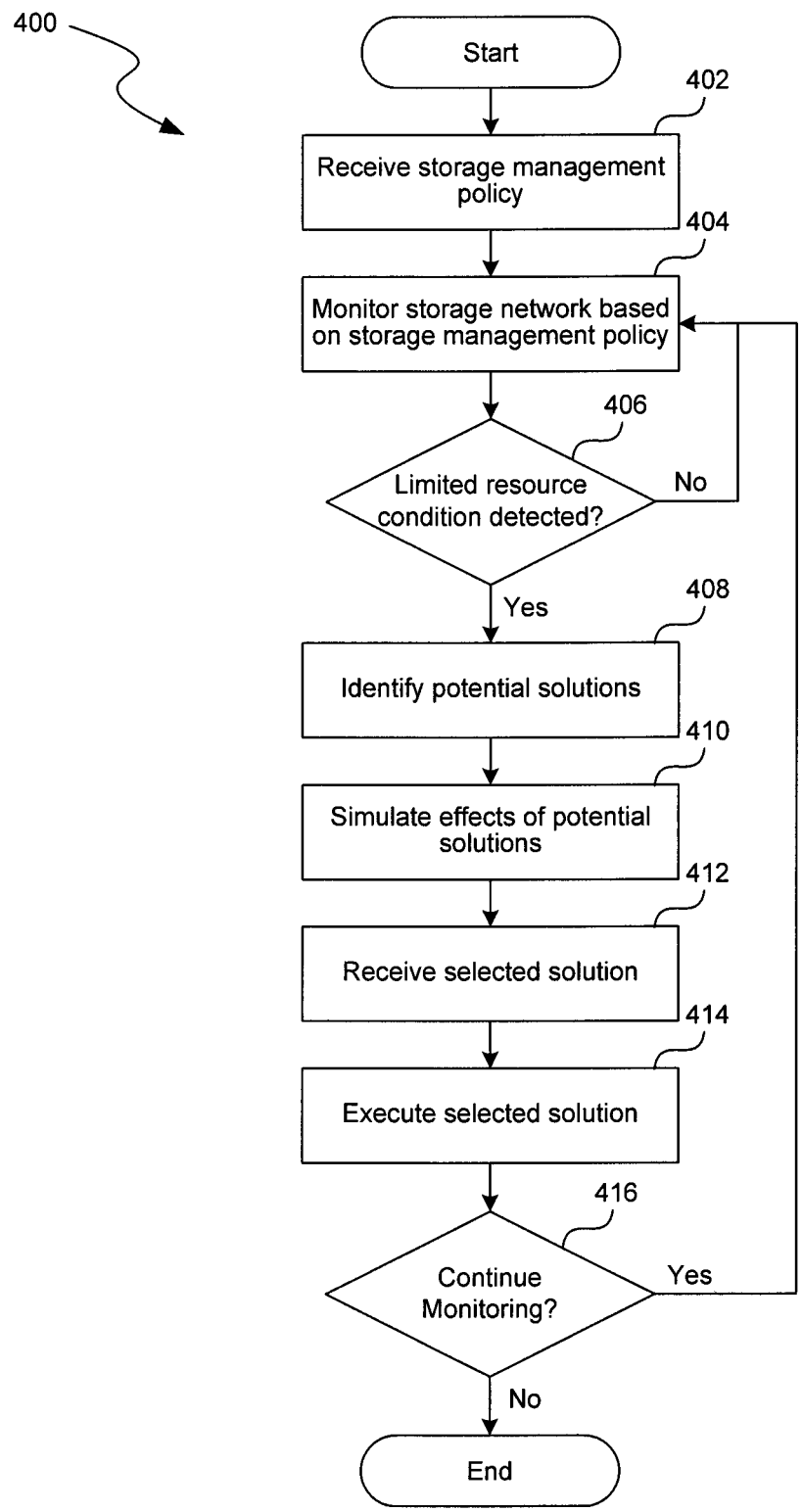
FIG. 4 is a flowchart of a process for implementing the storage management system.

FIG. 4 is a flowchart of a process 400 for implementing the storage management system. The process begins at block 402, where it receives a storage management policy. The storage management policy may be received from the user or an existing storage management policy may be loaded from the storage component 304. As noted above, the storage management policy may include one or more parameters for defining problem conditions in the storage network. These parameters may be defined globally, i.e. with a single parameter applied to all storage resources in the network. The parameters may also be individually defined for each storage resource in the system. For example, in a NAS configuration, the storage management policy may define separate thresholds for each logical volume. The storage management policy may be user defined or may be defined based on default values.

After loading the storage management policy, the system proceeds to block 404, where it monitors the storage network based on the storage management policy. During this step, the system monitors the space used by data and backup snapshots in storage resources in the network. The system may be configured to monitor some or all of the storage resources in the network. In one embodiment, the monitoring component 312 sends periodic queries to the storage server 108 to determine space usage for storage resources managed by the storage server 108. Alternatively, the storage server 108 may be configured with a local agent that regularly monitors storage usage for the server and sends a notification message to the monitoring component 312 after detecting a limited storage resource condition. After determining the level of storage usage in the system, the monitoring component 312 compares the determined storage usage against the thresholds defined in the storage management policy. The monitoring is carried out in a similar manner for storage networks having multiple storage servers.

The system then proceeds to decision block 406, where it determines if a limited storage resource condition has been detected based on the monitoring. If the monitoring component 312 determines that no limited storage resource condition exists, the system returns to block 404, where it continues monitoring the storage network based on the storage management policy. This loop continues until the monitoring component 312 detects that there is a limited storage resource condition.

If the monitoring component 312 detects a limited storage resource condition, the system proceeds to block 408, where it identifies potential solutions. In some embodiments, solutions are identified depending on the type of problem that was detected. For example, the system may store a mapping between the type of problem detected and a set of solutions that should be identified in response. A first potential solution is to resize the storage allocated to the storage resource. This could include changing either the current size or the maximum size for an individual volume. In a NAS configuration, the system may also change the size of the quota for a qtree. In storage systems such as those offered by Netapp, Inc., individual volumes in the system can automatically grow in response to increased storage needs. When the individual volume begins to run out of space, the network can automatically increase the allocated size of the volume up to a maximum size. Thus, one possible solution to the limited storage resource condition could be to increase the maximum size that the automatic growth process can use. The auto-grow functionality operates at the level of the individual volume, and generally does not take into account the needs of other volumes in a system or the status of the storage system as a whole. Thus, the solution identification module 314 may also identify a solution of reducing either the size or the maximum size of a volume that currently has more space than it needs and allocating the saved space to a volume that is running out of space. The system may be configured to do so, for example, if space usage in the first volume is low over a period of time. The system may also change the amount of space allocated to backup snapshots (i.e. backup data).

The solution identification component 314 may also identify solutions that delete or compress various types of data. For example, the system may suggest deleting or compressing data in a storage resources or backup snapshots of a storage resource. The system may also suggest deduplication, in which the system examines stored data at the data block level to determine if multiple data blocks contain the same data. The system can then reclaim free space by deleting redundant data blocks. The system may also identify a solution of migrating to new hardware or a new storage system, if there is no other way to make space available.

The solutions identified by the solution identification component 314 may depend on the reason for the limited storage resource condition. For example, if the amount of space used in a volume is near the threshold set in the policy, the system may suggest increasing the size of the volume or deleting one or more backup snapshots. However, if the space in a volume that has auto-growing characteristics is near the threshold, the system may suggest increasing the maximum size of the volume or deleting backup snapshots. If the space used in a qtree is near the threshold, the system may suggest increasing the quota applied to the qtree. If the space occupied by backup snapshots in a volume has crossed a threshold defined in the policy, the system may suggest deleting backup snapshot copies, increasing the size of the volume, or increasing the space allocated to backup snapshots. If the volume has reached a point where a new backup snapshot cannot be made, the system may suggest increasing the size of the volume.

After identifying potential solutions in block 408, the system proceeds to block 410, where it simulates the effects of some or all of the potential solutions. As discussed above, the effects of implementing an individual solution are often not easily predicted. For example, deleting a single backup snapshot may free little storage space because backup snapshots are sometimes stored as incremental differences from a previous backup snapshot. Thus, in such cases deleting a single snapshot only frees the potentially small set of blocks that differed from the previous snapshot. On the other hand, if the solution is to delete multiple snapshots, there may be sufficient snapshots deleted to free a significant amount of storage space. The system may algorithmically select snapshots to consider for deletion (e.g. deleting the oldest snapshots). The system may also receive information from the user selecting specific snapshots to consider for deletion.

Similarly, the effects of deduplication generally cannot be determined without evaluating all data blocks in the volume. Similar simulation steps can be applied to other potential solutions, such as resizing a logical volume or the quota of a qtree.

After simulating the effects of potential solutions, the system proceeds to block 412, where it receives the selected solution from the group of potential solutions. In one embodiment, the system presents the simulation results generated in block 410 to the user using the output component 306. The system then receives from the user a selection of a particular solution through the input block 308. In an alternative embodiment, the system is configured to automatically select one or more solutions from the potential solutions. This automatic selection may be executed based on a set of parameters or predefined configuration in the system. For example, the system may be configured to always attempt to increase the size of the volume when the available space falls below a threshold. Alternatively, the system may be configured to select a solution by balancing space gained against processing cost.

After receiving a selected solution in block 412, the system proceeds to block 414, where it executes the selected solution. The execution process modifies the storage network based on the selected solution and is carried out as discussed above with reference to FIG. 3. Thus in block 414, the task submodule 320 generates the set of tasks required to execute the selected solution and the dependency submodule 322 generates the set of dependencies associated with that task list. In one embodiment, the tasks and dependencies are generated based on a stored list that associates a set of tasks with each selected solution. The system may also store data specifying prerequisites for executing each task. For example, for a task that reduces the space allocated to a volume, the system may store a dependency requiring that it first execute a task that ensures there is sufficient unused space in the volume. The execution module 318 then executes the tasks according to the dependency list.

After executing the selected solution, the system proceeds to decision block 416, where it determines whether to continue monitoring. This may include, for example, detecting a user command to stop monitoring. If it is determined to continue monitoring, the system returns to block 404 and continues monitoring the storage network based on the storage management policy. Otherwise, the system terminates the monitoring process.

Figure 5A:
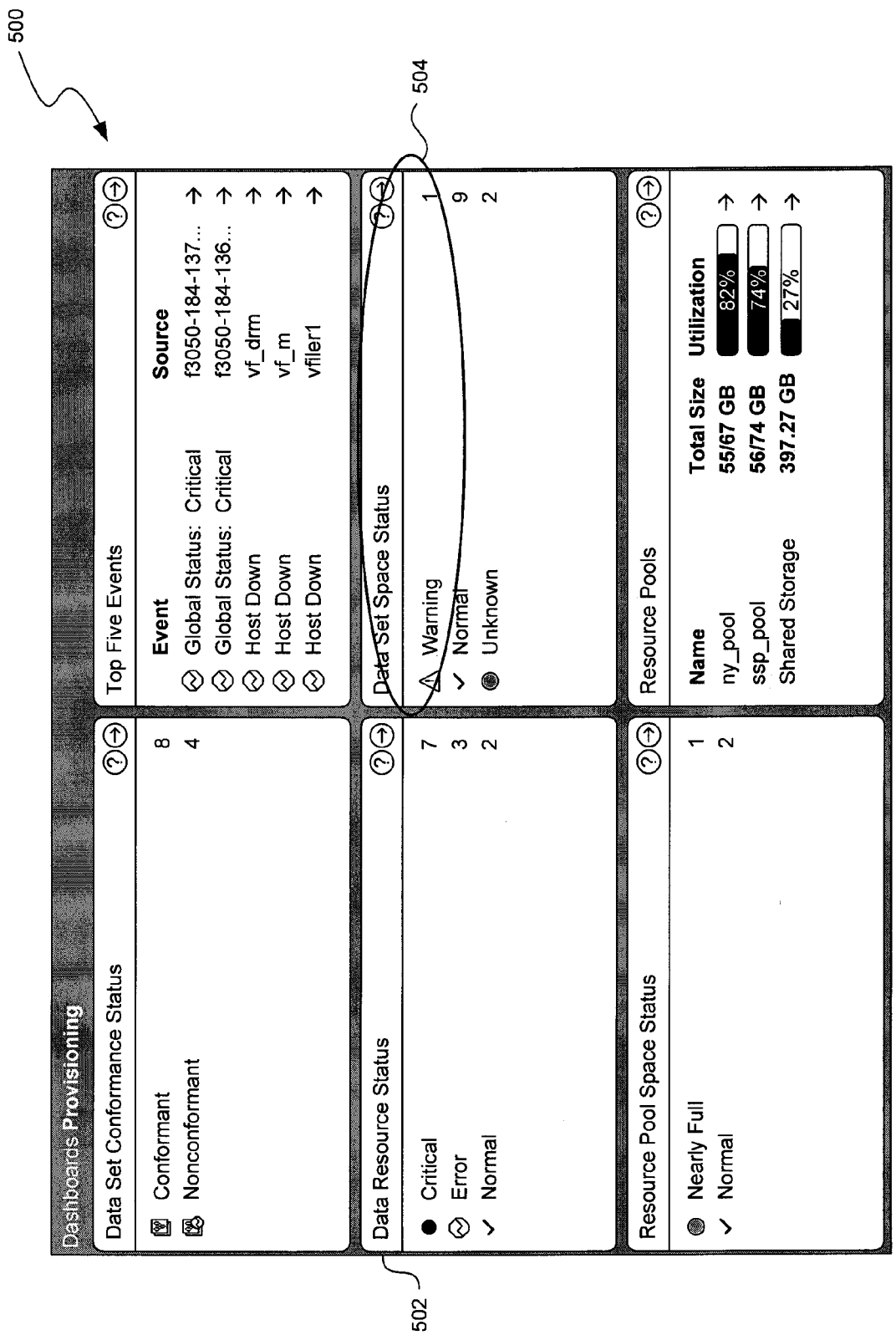
FIG. 5A is an example interface for providing a view of the overall health of the storage network.

FIGS. 5A through 5E show screens of an example graphical user interface that can be generated by the storage management system. FIG. 5A is an example interface 500 for providing a view of the overall health of the storage network. The interface 500 shows a summary of the results of the monitoring process. For example, the Data Set Resource Status panel 502 shows the status of individual data sets within the storage system. As shown in FIG. 5A, seven of the data sets in the system have critical status, three of the data sets have error status, and two of the data sets have normal status. The interface 500 also includes a Data Set Space Status panel 504, which shows the results of space monitoring. As shown in the interface 500, the storage network currently has nine data sets in a normal status, two data sets in an unknown status, and one data set with a warning status. The interface 500 also provides panels showing additional system information, such as resource pool status and data set conformance status.

Figure 5B:
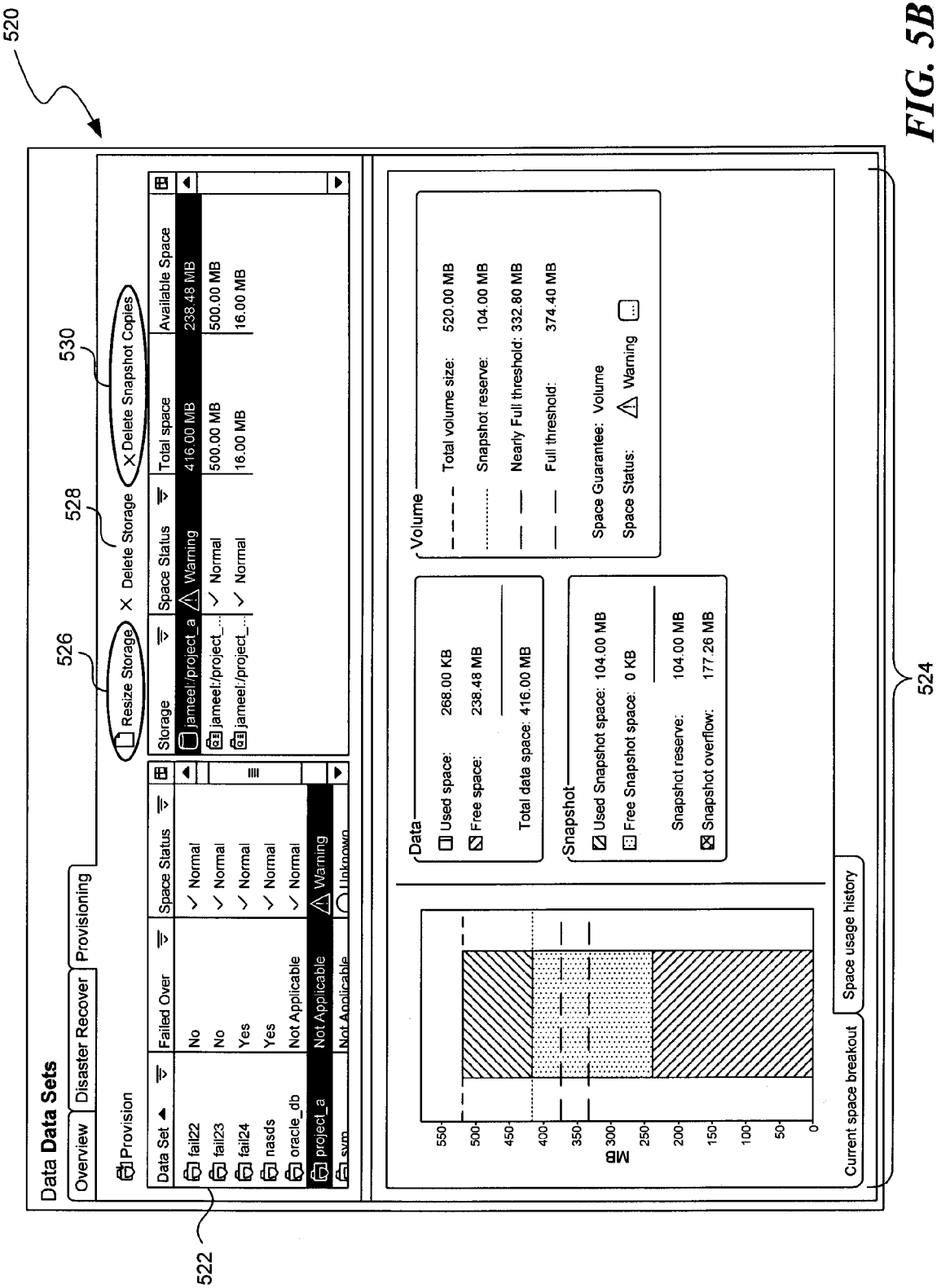
FIG. 5B is a provisioning and recovery interface suitable for displaying information relating to the error status to an end user.

FIG. 5B is a provisioning and recovery interface 520 suitable for displaying information relating to the error status to an end user. The interface 520 includes a data set list 522, which displays various data sets in the system. The interface 520 also includes an information panel 524, which displays additional information relating to the status of a selected data set from the list of data sets in the system. As shown in FIG. 5B, the selected data set has a space status of "Warning", because there is no free snapshot space available for this volume. The interface 520 also includes buttons that the user can select to attempt to resolve the warning status. The resize storage button 526 displays the interface shown in FIG. 5D, which enables the user to resize storage allocations such as volume size and snapshot space. The delete storage button 528 displays an interface that enables the user to delete data stored in the selected data set. The delete snapshot copies button 530 displays the interface shown in FIG. 5E, which enables the user to delete stored snapshots. Of course, other buttons could also be provided to enable additional actions, such as deduplication.

Figure 5C:
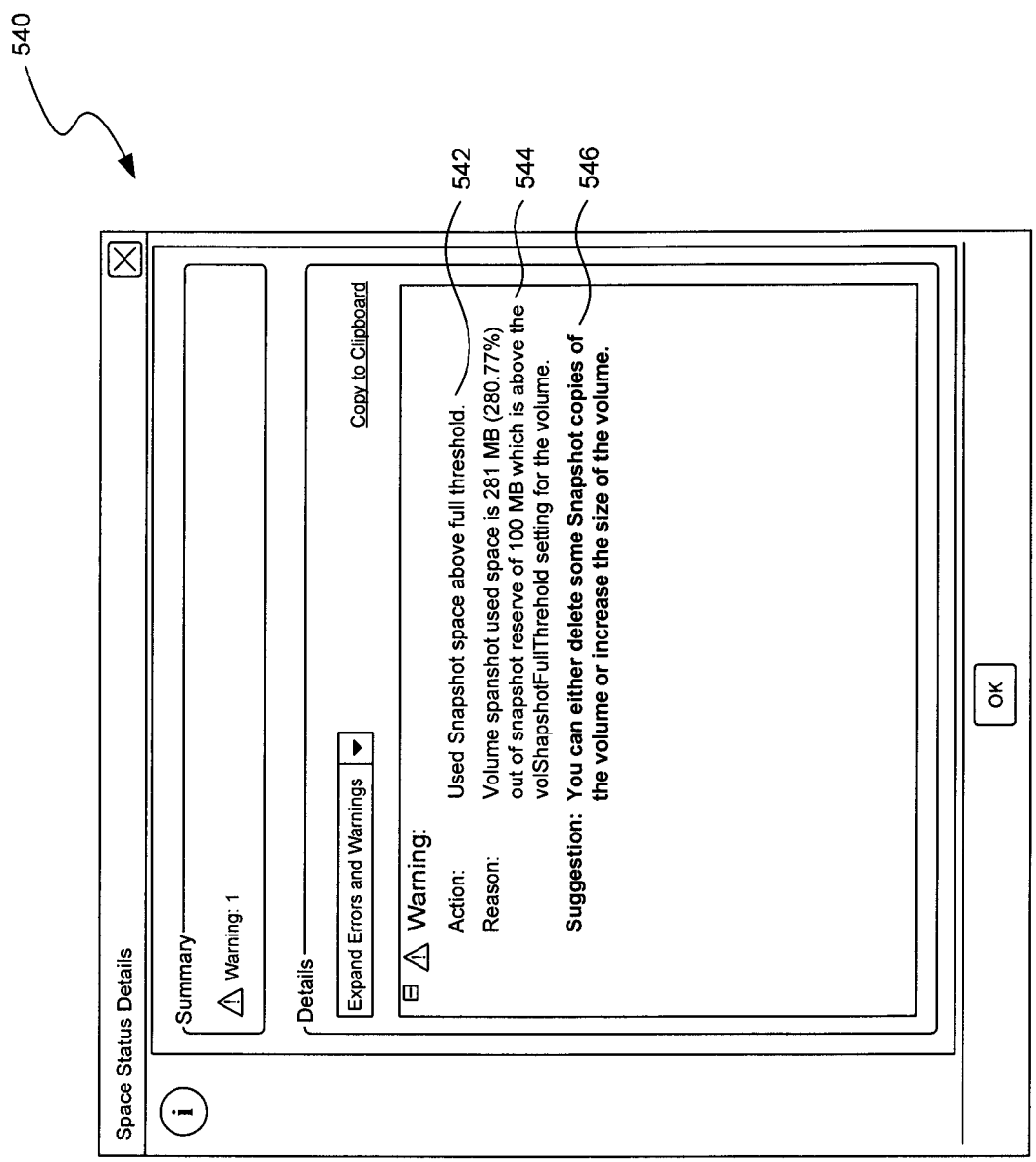
FIG. 5C is an example interface for providing status and suggestions to the user.

FIG. 5C is an example interface 540 for providing status and suggestions to the user. The interface 540 displays text describing the nature of the warning 542 and the reason 544 for the warning status. The interface 540 also provides one or more suggestions 546 for resolving the problem. In the example of FIG. 5C, the suggestions include deleting snapshots or increasing volume size.

Figure 5D:
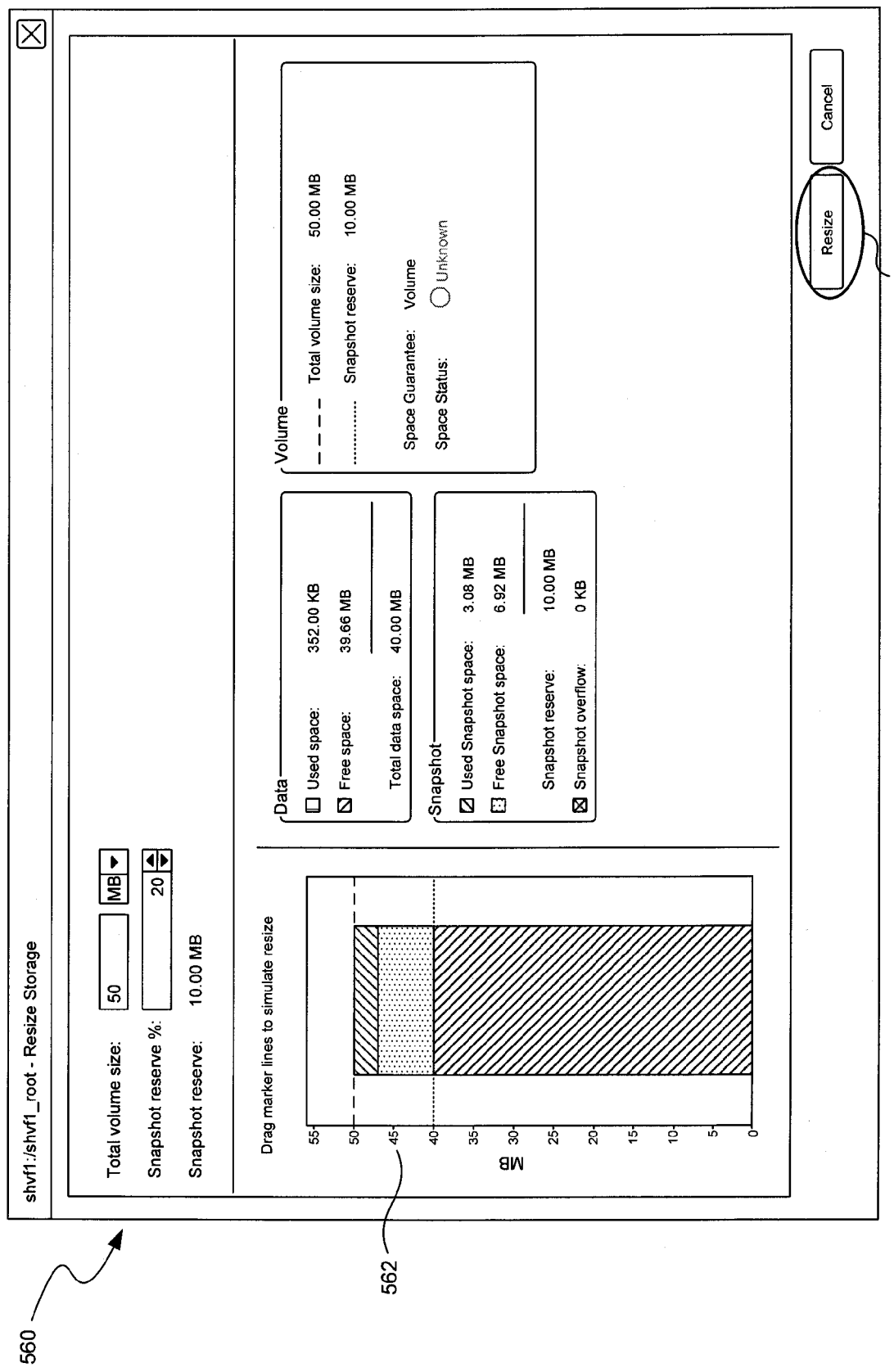
FIG. 5D is an example resize storage interface that can be used to resize the available storage for the volume.

Based on this suggestion, the user may choose to reconfigure the storage using the resize storage button 526, the delete storage button 528, or the delete snapshot copies button 530 from interface 520 in FIG. 5B. FIG. 5D shows an example resize storage interface 560 that can be used to resize the available storage for the volume. The interface 560 shows the currently used space and free space for both data and snapshots. The interface 560 includes a control component 562, which enables the user to dynamically change the size of the space allocated to both snapshots and to data in the volume by dragging marker lines. The system simulates the effects of the user's changes dynamically in the interface 560 before making any modifications to the storage network. When the user selects the resize button 564, the system executes the selected changes.

Figure 5E:
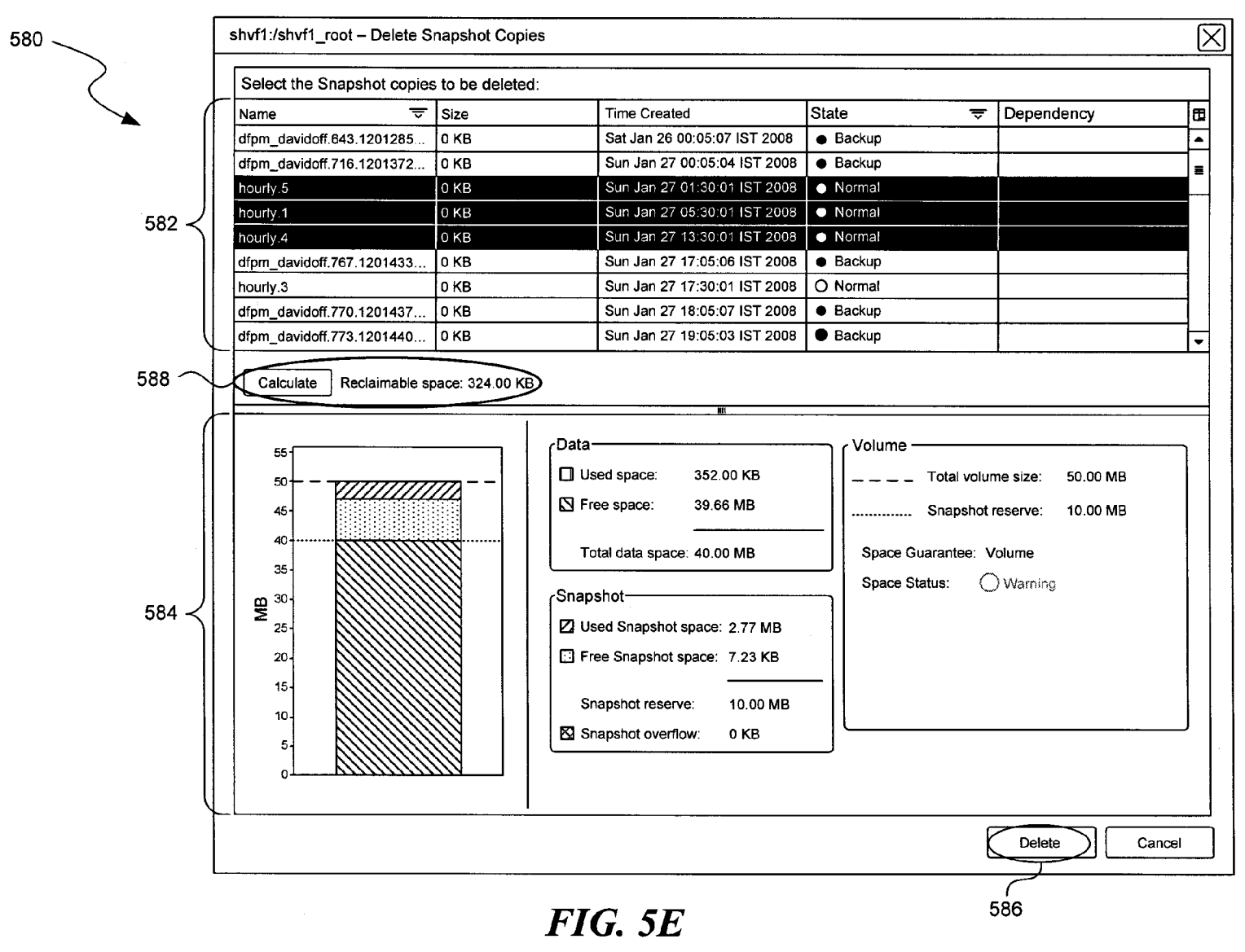

FIG. 5E is an example interface 580 that can be used to delete backup snapshots. The interface 580 includes a list 582 that shows available snapshots stored on the selected volume. The list 582 enables the user to select one or more of the snapshots for consideration for deletion. The interface 580 also includes a details panel 584, which graphically shows the effects on available storage space of deleting the selected snapshot copies. The display field 588 also shows the space that can be reclaimed by deleting the selected snapshots. When the user selects the delete button 586, the system deletes the selected snapshots.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A machine-implemented method comprising:
    accessing a storage management policy for evaluating a status of individual storage resources in a storage network, the storage management policy defining a threshold level of usage of a storage resource in the storage network;
    monitoring the storage network based on the storage management policy;
    detecting a limited storage resource condition in a logical segment of the storage network based on the monitoring, wherein the limited storage resource condition is detected when the amount of storage used in the storage resource exceeds the threshold level;
    identifying one or more potential solutions to the limited resource condition;
    for an individual solution of the one or more potential solutions, simulating effects on the plurality of storage resources of implementing the individual solution, wherein simulating effects includes determining a predicted change in available storage space that would occur in the logical segment if the individual solution were to be executed;
    determining a set of tasks required to execute a selected solution;
    determining dependences between tasks in the set of tasks; and
    modifying the storage network by executing the set of tasks according to the determined dependencies.

2. The method of claim 1, wherein the plurality of storage resources includes a plurality of logical volumes and the one or more potential solutions includes shrinking a selected logical volume of the plurality logical volumes.

3. The method of claim 1, wherein simulating effects comprises determining a cost of implementing the individual solution.

4. The method of claim 1, wherein simulating effects comprises determining an amount of storage space made available by implementing the individual solution.

5. The method of claim 1, further comprising:
    presenting simulated effects of the individual solution of the one or more potential solutions to a user; and
    receiving information from the user indicating the selected solution.

6. The method of claim 1, further comprising automatically selecting the selected solution from the one or more possible solutions without relying on any user input selecting the solution.

7. The method of claim 1, wherein the storage network is network attached storage.

8. The method of claim 1, wherein the storage network is a storage area network.

9. A computer system comprising:
    a memory;
    a processor coupled to the memory;
    a monitoring component configured to detect a limited storage resource condition in a logical segment of a storage network having a plurality of storage resources;
    a solution identifier component configured to identify one or more potential solutions in response to a limited storage resource condition;
    a simulation component configured to simulate effects of implementing individual solutions of the one or more potential solutions, wherein simulating effects includes determining predicted changes in available storage space that would occur in the logical segment if the individual solutions were to be executed; and
    an execution component configured to execute a selected solution of the one or more potential solutions;
    wherein the execution component comprises:
    a task component configured to determine a set of tasks required to execute the selected solution; and
    a dependency component configured to determine dependencies between the tasks in the set of tasks,
    wherein the execution component is further configured to execute the set of tasks according to the determined dependencies.

10. The system of claim 9, further comprising:
    a policy storage component configured to store a storage management policy; and
    a monitoring component configured to detect the limited storage resource condition based on the storage management policy.

11. The system of claim 9, further comprising:
    a policy storage component configured to store a storage management policy, the storage management policy defining a threshold level of usage of an individual storage resource in the storage network; and
    a monitoring component configured to detect the limited storage resource condition when the amount of storage used in the individual storage resource exceeds the threshold level.

12. The system of claim 9, further comprising an input component configured to receive information from a user selecting a solution from the one or more potential solutions.

13. The system of claim 9, wherein the one or more potential solutions includes compressing data stored in the storage network.

14. The method of claim 9, wherein the one or more potential solutions includes modifying a storage quota associated with the storage network.

15. The system of claim 9, wherein the storage network is network attached storage.

16. The system of claim 9, wherein the storage network is a storage area network.

17. The system of claim 9, further comprising:
a monitoring component configured to detect the limited storage resource condition.

18. A machine-implemented method comprising;
detecting a limited storage resource condition in a logical segment of a storage network having a plurality of storage resources;
identifying one or more potential solutions to the limited storage resource condition;
for an individual solution of the one or more potential solutions, simulating effects on the plurality of storage resources of the individual solution, wherein simulating effects includes determining a predicted change in available storage space that would occur in the logical segment if the individual solution were to be executed; and
modifying the storage network based on a selected solution of the one or more potential solutions; wherein the storage network stores data using a plurality of data units and the one or more potential solutions includes de-duplicating redundant data units.

19. The method of claim 18, wherein the storage network comprises a plurality of backup snapshots and simulating effects comprises determining storage space made available by deleting one or more backup snapshots of the plurality of backup snapshots.

20. The method of claim 18, further comprising automatically selecting the selected solution from the one or more possible solutions.

21. The method of claim 18, further comprising providing a suggested solution based on the simulated effects.

22. The method of claim 18, wherein the storage network is network attached storage.

23. The method of claim 18, wherein the storage network is a storage area network.

24. The method of claim 18, further comprising monitoring the storage network to detect the limited storage resource condition.

25. The method of claim 18, further comprising receiving configuration information defining a target configuration of the storage network, wherein the one or more potential solutions are identified based on configuration information.

* * * * *